Sept. 21, 1965             G. R. ENIX             3,207,326
PIPE HANDLING DEVICE
Filed Oct. 15, 1963                         2 Sheets-Sheet 1
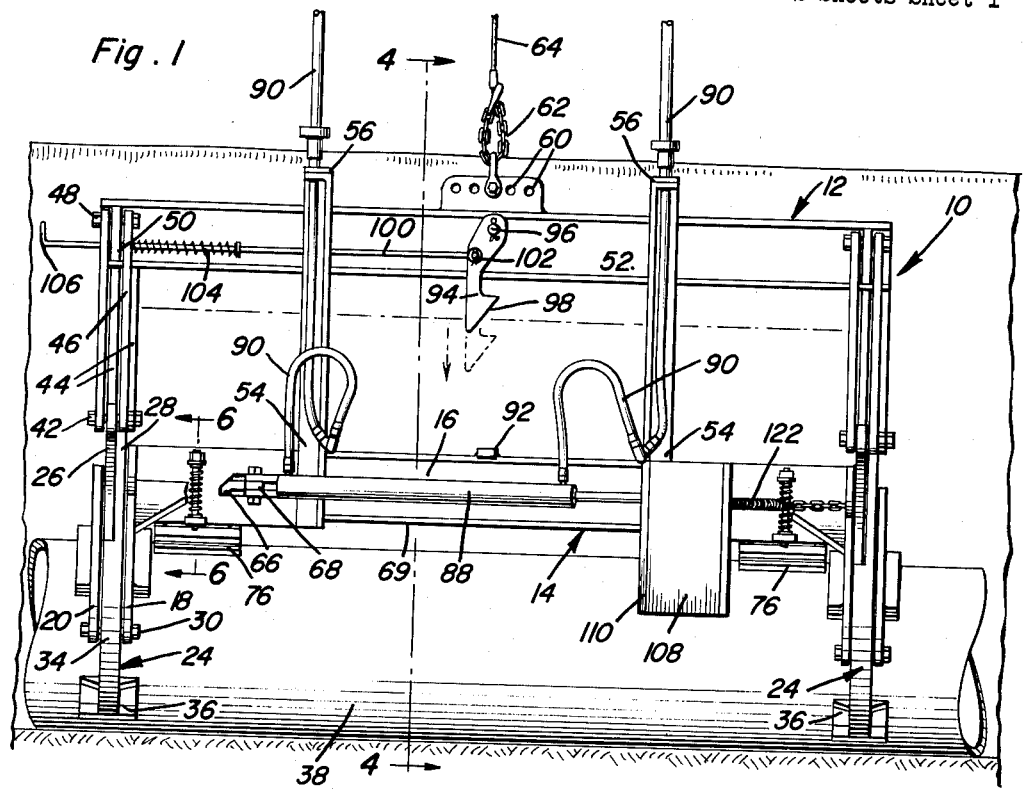
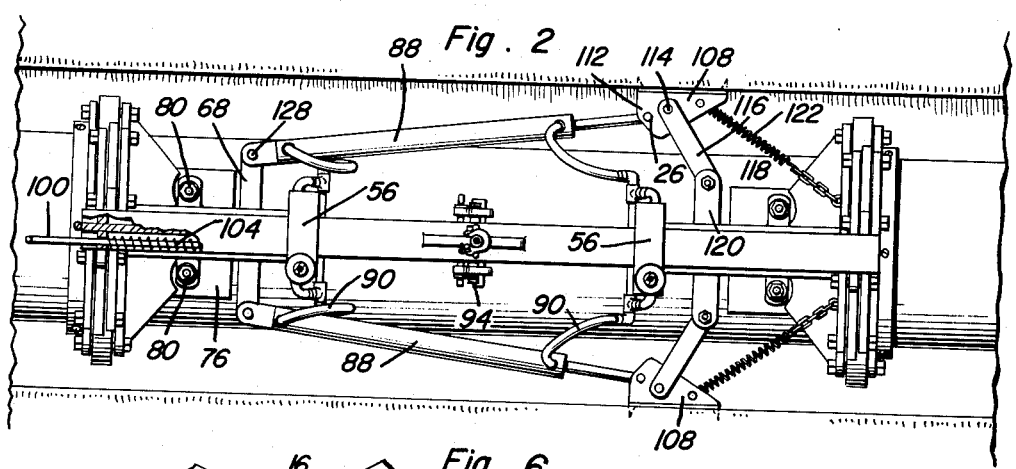
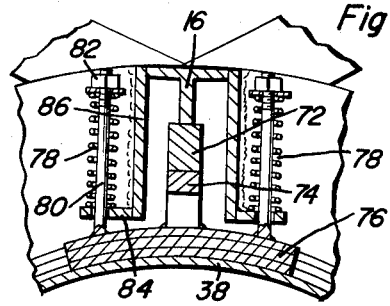
Garland Ramsey Enix
INVENTOR.

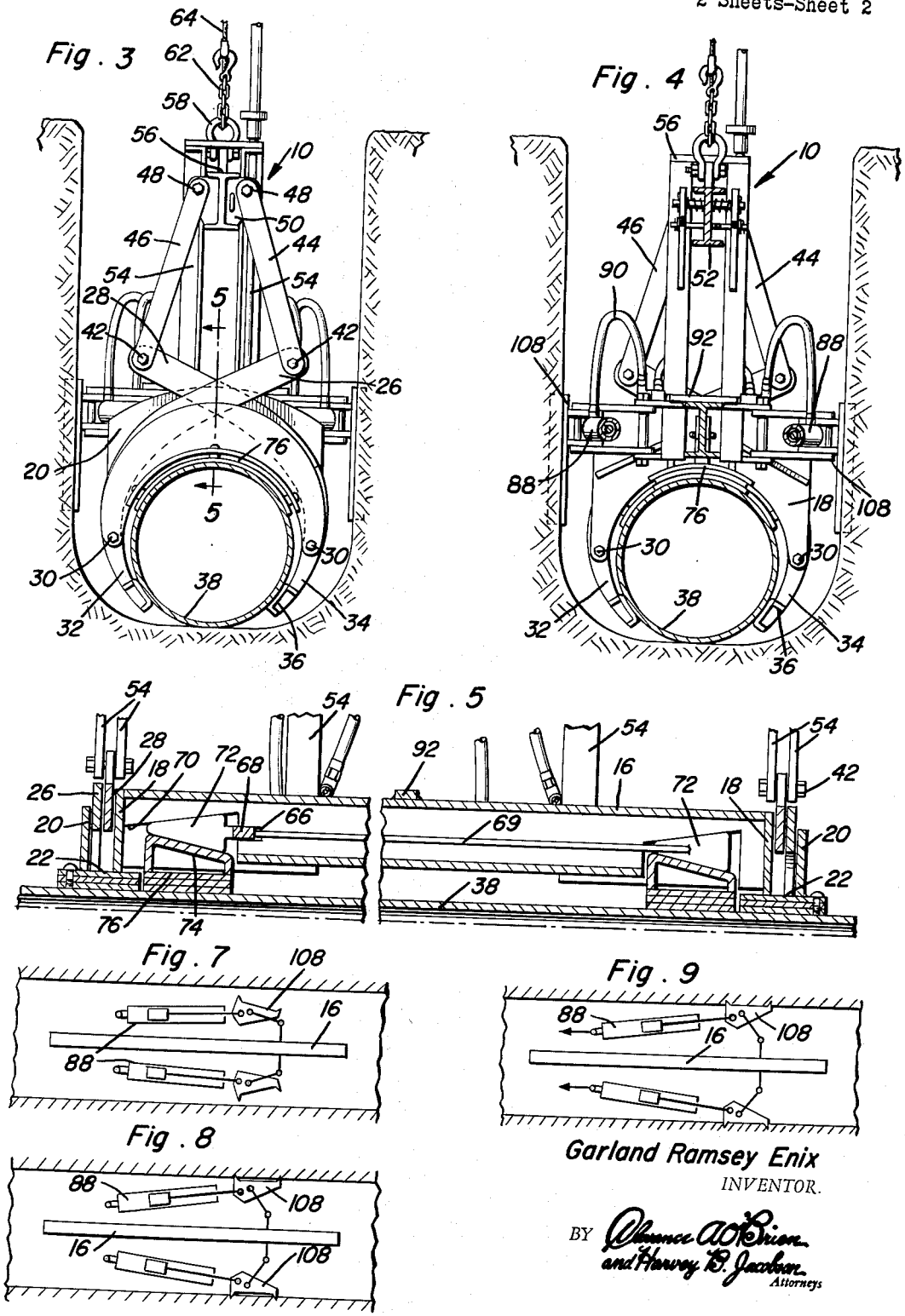

United States Patent Office 3,207,326
Patented Sept. 21, 1965

3,207,326
PIPE HANDLING DEVICE
Garland Ramsey Enix, P.O. Box 1393, Amarillo, Tex.
Filed Oct. 15, 1963, Ser. No. 316,249
10 Claims. (Cl. 214—1)

This invention comprises a novel and useful pipe handling device and more particularly pertains to a power operated pipe handling mechanism or grapple specifically adapted for handling and maneuvering pipes in trenches and particularly in connecting a pipe section to or disconnecting it from a pipeline in a trench.

The primary object of this invention is to provide a power operated mechanism for securely gripping a pipe section for lifting it into and out of a trench and for connecting it to or disconnecting it from a pipeline in a trench.

A further object of the invention is to provide a power operated pipe handling device in which the power operating means will upon initial operation effect a secure anchoring engagement of the device with the walls of a trench and with the pipe section being handled by the device and upon subsequent operation will controllably shift the pipe section being handled towards or from a pipeline.

Another object of the invention is to provide a power operated pipe grapple wherein the gripping jaws are latched in their inoperative position for movement into and out of a trench together with manually operated release means for the latch.

A further object of the invention is to provide a power operated grapple comprising a lower, jaw-carrying assembly and an upper, jaw-actuating assembly connected to said jaws and being guidingly engaged with said lower assembly.

Yet another object of the invention is to provide a power operated grapple including a support frame having front and rear sets of pivoted pipe gripping jaws thereon together with wedge means engaging both sets of jaws and simultaneously tightening them upon a pipe section to be handled by the device.

A still further important object of the invention is to provide a power operated pipe handling device which shall include upper and lower frame assemblies with the lower assembly carrying longitudinally spaced sets of pipe gripping jaws thereon and with the upper assembly being movable towards and from the lower assembly and guide means slidingly engaging said assemblies together with a scissors linkage connecting means by which the upper section is secured to the jaws of the lower section whereby movement of the sections towards and from each other will effect opening and closing movement of the jaws, and improved means for mounting the jaws on the lower section, wedging means for tightening the gripping action of the jaws upon a pipe section to be handled thereby, power operating means for successively anchoring to the walls of a trench, tightening the jaws upon the pipe section being handled and thereafter moving the lower assembly and the engaged pipe section relative to the trench together with releasable means for coupling the upper section in close relation to the lower section and thereby maintain the jaws in their open position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an exemplary embodiment of a pipe handling device in accordance with this invention, the device being shown engaged upon a pipe section for manipulating the latter and certain parts being shown in dotted lines in an alternative position thereof;

FIGURE 2 is a top plan view of the arrangement of FIGURE 1;

FIGURE 3 is an end elevational view from the left side of FIGURE 1 and showing in vertical transverse section a trench in which the device is received for manipulating a pipe section therein;

FIGURE 4 is a view in vertical transverse section taken substantially upon the plane indicated by the section line 4—4 of FIGURE 1;

FIGURE 5 is a vertical longitudinal sectional view taken upon an enlarged scale substantially upon the plane indicated by the section line 5—5 of FIGURE 3, parts being omitted and showing in particular the wedging means for tightening the grip of the jaws upon a pipe section;

FIGURE 6 is a further detail view taken upon an enlarged scale in vertical transverse section substantially upon the plane indicated by the section line 6—6 of FIGURE 1 and showing in particular the wedging and the resilient means for the jaws of the device; and, FIGURES 7–9 are sequential diagrammatic views indicating the operation of the power operating means of the device.

The pipe handling device in accordance with this invention is indicated generally by the numeral 10 and as shown includes upper and lower assemblies 12 and 14 respectively, which are operatively connected together in a manner to be subsequently described. Considering first the lower assembly which constitutes the supporting frame of the implement, it will be noted that this includes an elongated I-beam member 16 having transversely extending longitudinally spaced pairs of end plates or flanges as at 18 and 20 at its opposite ends. As will be noted particularly from FIGURE 5, the two flanges or end plates are spaced from each other and are fixedly joined together as by a bottom plate 22 to thus provide a transversely extending U-shaped channel. The construction is identical at each end of the I-beam 16.

Carried by the I-beams in the above mentioned transverse channels are longitudinally spaced sets or pairs of cooperating gripping jaws, each set being indicated by the numeral 24. The arrangement of the sets is indicated in FIGURE 1 while the construction of the jaws within each set is shown more clearly in FIGURE 3. Each set of jaws includes a pair of jaws 26 and 28 each of which is pivoted as at 30 to a midportion of and between the C-shaped end plates 18 and 20 in the channels thereof. The lower curved ends of the jaws 26 and 28 are shown respectively at 32 and 34 and are provided with suitable gripping elements as at 36 suitably contoured and of sufficient longitudinal extent to firmly and effectively grip the sides of a pipe section 38 which is to be handled by the device.

At their upper ends, the jaws 26 and 28 are secured by pivots 42 to a pair of links 44 and 46 respectively, whose upper ends are pivotally attached as at 48 to mounting brackets 50 carried by the I-beam 52 of the upper assembly 12. It will be observed that the links 44 and 46 are in pairs which embrace therebetween the ends 26 and 28 of the jaws and the bracket 50.

As so far described it is to be understood that each jaw assembly is attached to and carried by the upper assembly 12 and specifically to the I-beam 52 thereof, and is engaged with the lower assembly 14 by virtue of the positioning of the jaws in the pockets between the plates 18 and 20. It is intended that the linkage of the jaws shall be such that gravity will tend to close the jaws, the movement of the upper and lower assemblies away from each other effecting this gravity operation. When the upper and lower assemblies are moved towards each other, the jaws will be opened as will be readily apparent.

Fixedly secured to and rising from the I-beam 16 of the lower assembly 14 is a pair of standards each indicated at 54, there being one such pair of standards for each of the jaw assemblies and disposed adjacent thereto. Each pair of standards extends upwardly from the lower I-beam and embraces the upper I-beam 52 to guide the latter in its sliding movement towards and from the lower I-beam during the operation of the jaw assemblies. Secured to the upper ends and bridging the standards 54 of each pair is a cap plate 56 which thus imparts rigidity to the standards.

Intermediate its ends, the upper I-beam 52 is provided with a lifting bracket 58 having a series of apertures 60 therein by means of which a chain or the like 62 may be selectively attached thereto enabling a lifting cable 64 to be operatively connected to the upper assembly 12 to effect lifting or lowering of the latter and of the entire device into and out of a trench.

Reference is now made more specifically to FIGURES 1, 5 and 6. Adjacent one end, the web of the lower I-beam 16 is longitudinally slotted as at 66 and a jaw clamping bar 68 extends transversely through and is slidable longitudinally in said slot. Outwardly of this slot 66, the web of the I-beam 16 is further notched to provide an inclined camming surface 70 and a wedge 72 carried by the bar 68 slidably engages the cam surface 70 upon its upper side and at its lower side engages the inclined top surface 74 of a pressure foot 76 which is adapted to engage the upper surface of the pipe section 38. Compression springs 78 encircling mounting bolts 80 and which latter are secured to the pressure foot 76 are adjustably compressed by the adjusting nuts 82 on the upper ends of the bolts and bear at their lower ends against outwardly projecting support flanges 84 at the lower ends of the brackets 86 formed upon the lower I-beam 16. A similar wedge and cam surface arrangement, but with the clamping bar 68 omitted is provided at the other end of the assembly. The arrangement is such that these springs tend to yieldingly urge the pressure feet upwardly and out of engagement with the pipe section, whereas longitudinal outward movement of the wedges 72 will urge these pressure feet down into engagement with the top surface of the pipe section and in turn by their reaction on the cam surface 70 of the I-beam will lift the lower I-beam and the jaw assemblies to tighten the grip of the latter upon the pipe section. The clamping bar 68 and its opposite wedge are rigidly connected for simultaneous movement by a pair of rods 69 lying closely adjacent opposite sides of the web 16.

In order to effect controlled reciprocation of the jaw clamping bars 68 during the pressure foot applying and releasing operation, there is provided a power operating means consisting of a pair of fluid pressure operating cylinder units 88 which are disposed upon each side of the web of the lower I-beam 16. Each cylinder unit is supplied with fluid pressure from any suitable source, not shown, as by the fluid supply conduits 90 at each end of the cylinder, these conduits extending upwardly through the previously mentioned cap plates 56 to suitable manually operated fluid pressure control means, not shown. Obviously, by manipulation of this control means the cam wedges may be caused to selectively extend or retract the pressure feet from the lower I-beam and relative to the pipe section 38.

It will also be observed that there is provided a latching mechanism by which the lower assembly is releasably retained in a retracted position adjacent the upper assembly 12. For this purpose, the I-beam 16 is provided with a transversely extending latching bar 92 which is adapted to be engaged by a latch hook 94 pivoted at 96 to the upper I-beam 52. The latch hook has a cam surface 98 thereon which as the two assemblies approach each other slides over the latch bar 92 and then grips the underside of the latter. An actuating rod 100 is pivotally secured to the latch hook 94 as by a pivot 102 thereon and extends to and beyond the adjacent end of the upper I-beam 52. A spring 104 engages the rod 100 and yieldingly urges it in a position to retain the latch hook in latching position. A handle 106 on the end of the rod provides a means by which the latter may be manually operated to disengage the hook from the latch bar and thus permit the lower assembly under the influence of gravity to drop to its lower and jaw-closing position. Thus, the latch means retains the lower assembly in its upper or jaw-opened position to facilitate the application of the device to or its removal from a pipe section and when the latch means is disengaged, the lower assembly will drop under the influence of gravity and cause the jaws to close upon the pipe section.

The device also includes a pair of anchor shoes 108 each of which may comprise a vertically extending channel member 110 carried by a horizontally extending web or bracket 112. Each bracket in turn is secured by a pivot 114 to a link 116 whose other end is pivoted as at 118 to a transversely disposed mounting bracket 120 carried by the lower I-beam 16. A spring 122 engages each anchor shoe and yieldingly urges it and its connecting link to a retracted position against the side of the I-beam 16 of the lower assembly. Power actuating means in the form of the previously mentioned fluid pressure operating cylinder unit 88 is pivotally connected as at 126 to the web 112 and at its other end is pivotally connected at 128 to the previously mentioned jaw-clamping bar 68.

The operation of the anchor shoe is thus synchronized with the operation of the pressure shoe and is affected by the same pair of fluid pressure operating cylinder units 88. This operation is as follows:

With the cylinder units 88 in their retracted position, the cams 72 are disengaged from their camming action with the cam surfaces 70 and the cam surface 74 of the pressure shoe 76 and also the links 116 are collapsed about their pivots 118 towards the I-beam 16 with the anchor shoes 108 being thus retracted against the lower assembly. After the device has been placed upon a pipe section, fluid pressure is applied through the conduits 90 to the units 88. During the initial portion of the application of such fluid pressure, the cams 72 engage the surfaces 70 and 74 to thus set the pressure shoes and securely clamp the jaws upon the pipe section. Continued expansion of the units 88 then causes the anchor shoes 108 to pivot about their links 116 and move outwardly into abutting and anchoring engagement with the sides of the trench as illustrated in FIGURES 3 and 4. Final expanding movement of the units 88 then causes these cylinders to push the entire device 10 forwardly from the now fixed abutments provided by the anchor shoes 108 and thus move the attached pipe section correspondingly in the trench.

FIGURES 7–9 bring out more clearly the sequence of events which occur during this operation. With the lower I-beam 16 and the pressure units 88 being shown therein, it will be observed that in the initial position shown in FIGURE 7, the units 88 are in their collapsed position with the anchor shoes 108 being retracted towards the I-beam. The device is thus clear of the walls of the trench. In the position shown in FIGURE 8, the units 88 have expanded to a position where the jaws have been wedged into gripping engagement with the pipe section, and have been further expanded to a position where the anchor shoes 108 have been anchored or abutted against the sides of the trench. In the final position shown in FIGURE 9, further expansion of the units 88 now moves these units and the attached I-beam 16 and the pipe section clamped thereto in the direction indicated by the arrows therein towards the left from the stationary anchor shoes, thus moving the pipe section longitudinally of the trench.

It will thus be apparent that there has been provided a device of a greatly simplified operation and in which a single power operating means doing a single cycle of operation performs the successive functions of setting or clamping the jaws to the pipe section, setting the anchor shoes against the trench wall and finally throughout the remainder of the stroke of the fluid pressure operating cylinder units effecting longitudinal movement of the pipe section and of the device in a trench.

The reverse application of the device to a pipe section may be employed when it is desired to disconnect or remove a pipe section from a pipeline.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated pipe handling device comprising horizontally elongated upper and lower assemblies adapted for relative vertical movement, a set of horizontally elongated pipe gripping jaws connected to one of said assemblies for opening and closing movement in response to relative vertical movement of said assemblies toward and from each other respectively, a pair of anchor shoes, mounting means hingedly securing each shoe to one side of one of said assemblies for horizontal swinging movement between a retracted position adjacent said one assembly and an extended position remote from said one assembly and into anchoring engagement with the side of a trench in which said device is disposed, power operated means connected to said device and to said shoes and effecting horizontal swinging movement of the latter and horizontal movement of said assemblies relative to said shoes whereby to advance said device longitudinally in a trench.

2. The combination of claim 1 including means connected to said jaws for locking the latter in gripping engagement with a pipe section.

3. The combination of claim 2 wherein said power operated means is connected to said jaw locking means.

4. The combination of claim 3 wherein said power operated means is operable upon initial movement to actuate said jaw locking means, upon further movement actuates said shoes to anchoring position and upon final movement causes said longitudinal movement of said device in a trench.

5. A power operated pipe handling device comprising horizontally elongated upper and lower assemblies adapted for relative vertical movement, a set of horizontally elongated pipe gripping jaws connected to one of said assemblies for opening and closing movement in response to relative vertical movement of said assemblies toward and from each other respectively, latch means carried by one assembly and engageable with the other assembly and locking said assemblies in their proximate position with said gripping jaws in their open position, a manual release means connected to said latch means and operable to disengage said latch and permit said assemblies and jaws to be gravity biased into jaw closing position, a pair of anchor shoes, mounting means hingedly securing each shoe to one side of one of said assemblies for horizontal swinging movement between a retracted position adjacent said one assembly and an extended position remote from said one assembly and into anchoring engagement with the side of a trench in which said device is disposed, power operated means connected to said device and to said shoes and effecting horizontal swinging movement of the latter and horizontal movement of said assemblies relative to said shoes whereby to advance said device longitudinally in a trench.

6. A power operated pipe handling device comprising horizontally elongated upper and lower assemblies adapted for relative vertical movement, a set of horizontally elongated pipe gripping jaws connected to one of said assemblies for opening and closing movement in response to relative vertical movement of said assemblies toward and from each other respectively, said jaws being each pivotally connected to both assemblies, a jaw setting means mounted on one assembly and connected to said jaws for effecting movement of said jaws towards their closed position, said jaws being each pivoted to a C-shaped carrier plate movably mounted on said one assembly, said jaw setting means including movable wedges interposingly engaging said one assembly and said carrier plate, and power operating means connected to said one assembly and to said wedges.

7. A power operated pipe handling device comprising upper and lower assemblies,
  means connecting said assemblies for relative vertical movement,
  a set of pipe gripping jaws,
  means connecting said set of jaws to said assemblies for opening and closing movement relative to each other in response to relative vertical movement of said assemblies toward and from each other,
  a pair of anchor shoes,
  mounting means hingedly securing each shoe to one of said assemblies for lateral swinging movement from the associated assembly in a generally horizontal direction between a retracted position adjacent the associated assembly and an extended position remote from the associated assembly and into anchoring engagement with the adjacent side of a trench in which said device is disposed,
  power operated means connected to said device and to said shoes and effecting lateral swinging movement of the latter and movement in a longitudinal and generally horizontal direction of said assemblies relative to said shoes whereby to anchor said shoes against the sides of a trench and advance said device longitudinally in a trench.

8. The combination of claim 7 including latch means carried by one assembly and engageable with the other assembly and locking said assemblies in their proximate position with said gripping jaws in their open position, a manual release means connected to said latch means and operable to disengage said latch and permit said assemblies and jaws to be gravity biased into jaw closing position.

9. A power operated pipe handling device comprising upper and lower assemblies,
  means connecting said assemblies for relative vertical movement,
  a carrier plate assembly movably mounted upon one of said assemblies,
  a pair of cooperating pipe gripping jaws,
  means pivotally connecting each of said jaws to both of said assemblies and to said carrier plate assembly for effecting opening and closing movement of said jaws in response to relative vertical movement of said assemblies toward and from each other, respectively,
  jaw setting means including movable wedges interposingly engaging said one assembly and said carrier plate assembly and operable to effect movement of said jaws toward their closed position,
  power operating means connected to said device and to said wedges for effecting movement of said wedges.

10. A power operated pipe handling device comprising upper and lower assemblies,
  means connecting said assemblies for relative vertical movement, a carrier plate assembly movably mounted upon one of said assemblies, a pair of cooperating pipe gripping jaws, means pivotally connecting each of said jaws to both of said assemblies and to said carrier plate assembly for effecting opening and closing movement of said jaws in response to relative vertical movement of said assemblies toward and from each other, respectively, jaw setting means including movable wedges interposingly engaging said one assembly and said carrier plate assembly and operable to effect movement of said jaws toward their closed position, power operating means connected to said device and to said wedges for effecting movement of said wedges, a pair of anchor shoes, mounting means hingedly securing each shoe to one of said assemblies for lateral swinging movement from the associated assembly in a generally horizontal direction between a retracted position adjacent the associated assembly and an extended position remote from the associated assembly and into anchoring engagement with the adjacent side of a trench in which said device is disposed, said power operated means connected to said device and to said shoes and effecting lateral swinging movement of the latter and movement in a longitudinal and generally horizontal direction of said assemblies relative to said shoes whereby to anchor said shoes against the sides of a trench and advance said device longitudinally in a trench.

References Cited by the Examiner

UNITED STATES PATENTS

| | | | |
|---|---|---|---|
| 905,010 | 11/08 | Simmons. | 254—29 |
| 1,707,123 | 3/29 | Keck | 294—119 X |
| 2,381,045 | 8/45 | Gammel | 254—29 X |
| 2,958,125 | 11/60 | Nichols | 294—88 X |
| 3,001,812 | 9/61 | Anderson | 294—119 X |
| 3,055,692 | 9/62 | Kausche | 294—119 X |

FOREIGN PATENTS 118,963   4/59   Russia.

GERALD M. FORLENZA, *Primary Examiner.*

MARVIN A. CHAMPION, *Examiner.*